United States Patent

Koskinen et al.

[11] Patent Number: 5,472,923
[45] Date of Patent: Dec. 5, 1995

[54] PREPARATION OF A SOLID ZIEGLER CATALYST BY USING A MULTI-FUNCTIONAL, PIVOTING, INCLINABLE REACTOR

[75] Inventors: Jukka Koskinen, Espoo; Thomas Garoff, Helsinki; Jarmo Louhelainen, Vantaa, all of Finland

[73] Assignee: Borealis Holding A/S, Lyngby, Denmark

[21] Appl. No.: 196,225

[22] PCT Filed: Nov. 27, 1992

[86] PCT No.: PCT/FI92/00323

§ 371 Date: Mar. 22, 1994

§ 102(e) Date: Mar. 22, 1994

[87] PCT Pub. No.: WO93/11165

PCT Pub. Date: Oct. 6, 1993

[30] Foreign Application Priority Data

Nov. 29, 1991 [FI] Finland ............................. 915631

[51] Int. Cl.$^6$ .............................. B01J 33/00; B01J 37/00
[52] U.S. Cl. ......................... 502/151; 502/150; 502/169; 502/514
[58] Field of Search ....................... 502/151, 150, 502/169, 514

[56] References Cited

U.S. PATENT DOCUMENTS 1,331,903  2/1920  Elder .................................. 502/151

FOREIGN PATENT DOCUMENTS 0335551  10/1989  European Pat. Off. .
0436423  7/1991  European Pat. Off. .

*Primary Examiner*—Asok Pal
*Attorney, Agent, or Firm*—Birch, Stewart, Kolasch & Birch

[57] ABSTRACT

A method for the preparation of a solid procatalyst suitable for the polymerization of olefins wherein the procatalyst comprises a transition metal compound reacted with a carrier by carrying out in the method the following consecutive steps: (a) feeding the transition metal compound and particles of the carrier into a vessel, which in its initial position has an essentially horizontal bottom sieve, (b) mixing and reacting the metal transitional compound and the particles of the carrier to produce raw procatalyst particles and a liquid reaction residue, (c) removing the liquid reaction residue through the bottom sieve of the vessel, (d) washing the raw procatalyst particles with a washing liquid, so that impurities in the raw procatalyst are removed through the bottom sieve, (e) drying the washed raw procatalyst particles by conducting an inert gas therethrough to give the solid procatalyst, and (f) removing the solid procatalyst from the vessel.

20 Claims, 1 Drawing Sheet

PREPARATION OF A SOLID ZIEGLER CATALYST BY USING A MULTI-FUNCTIONAL, PIVOTING, INCLINABLE REACTOR

FIELD OF THE INVENTION

The invention relates to a method for the preparation of a solid catalyst suitable for the polymerization of olefins which comprises a transition metal compound reacted upon a carrier by carrying out in the method the following consecutive steps:
a) the transition metal compound and particles of the carrier are fed into a vessel, where they
b) are mixed and reacted to raw procatalyst particles and a liquid reaction residue,
c) the reaction residue is removed through a bottom sieve in the vessel,
d) the raw procatalyst is washed with a washing liquid, so that its impurities are removed through the above-mentioned bottom sieve,
e) the washed raw procatalyst is dried by conducting inert gas through it, and
f) the prepared procatalyst is removed from the vessel.

The invention also relates to equipment for the preparation of such a solid procatalyst intended for olefin polymerization that comprises a transition metal compound reacted for a carrier by means of the above feed, reaction, separation, removal, washing and drying operations. The equipment comprises:
i) a vessel furnished with an aggregate and valves for bringing together, keeping together and removing of the materials participating in the operations,
ii) a mixer provided inside the vessel for the mixing of the above-mentioned materials, and
iii) a bottom sieve provided inside the vessel for the separation of the procatalyst particles from the above-mentioned materials.

BACKGROUND OF THE INVENTION

For the polymerization of olefins, to which the method and equipment according to the invention relates, the Ziegler-Natta catalyst system is commonly used, which consists of a so-called procatalyst and a cocatalyst. The procatalyst is based on a compound of a transition metal belonging to any of the groups IVA–VIII (Hubbard) of the periodical table of the elements and the cocatalyst is based on an organometallic compound of a metal belonging to any of the groups IA–IIIA (Hubbard) of the periodical table of the elements. The procatalyst can also comprise a carrier, on which the transition metal compound is layered, and an internal electron donor improving and modifying the catalytic properties thereof.

The reacting of the transition metal compound onto the surface of the carrier is carried out between a solid phase carrier being and most frequently a liquid transition metal compound or a transition metal compound in a liquid. Thus this stage of the procatalyst preparation includes the operations where the starting materials are fed into the reaction vessel and suitable reaction conditions are created therein to separate the unreacted liquid from the product and to wash and dry the product.

The carrier layered with the transition metal compound is available for use as a dried powder for the polymerization of olefins, whereby the combination with the co-catalyst is carried out before or at the start of the polymerization operation. The above-mentioned operations for the preparation of a procatalyst are usually carried out in different units and thus the intermediate products must be transferred from one unit to another during the production. As both the reaction components and the reactions are very sensitive to impurities, such as the oxygen and moisture of the air, such transfer operations can result in low and unequal quality. Moreover, the various reaction and washing operations succeeding each other require that the created solid precipitate sinks to the bottom of the vessel, whereby the agitation must be stopped and the liquid siphonated away from the surface of the precipitate. Such an operation leaves an abundance of activation and washing liquid in the precipitate, for which reason its separation and washing effect is weak and many washing stages are required before a required purity grade is achieved.

Accordingly, an unreasonable amount of time and washing chemicals are spent in the present operations and, moreover, a part of the usable solid material disappears in the siphonation stage as it is dispersed in the liquid to be removed.

The drying stage can be very problematic since the polymerization catalyst, being sensitive to the oxygen and moisture in the air, can, in the absence of a protecting liquid layer, be destroyed, unless the operations are carried out in a very inert, dry and oxygen-free atmosphere. When mechanical driers are used the danger exists that the fragile catalyst particles are broken and imperceptible air leakages easily occur during the vacuum drying which destroy the catalyst.

To solve the above-mentioned problems it is known to use the method according to the Finnish patent No. 83329 and a multi-function reactor, in which all or an essential part of the transfer, reaction, washing and drying operations are carried out in a multi-function reactor furnished with a mixer and a bottom sieve net which is permeable to as well the liquid and finely-divided solid materials separated from the catalyst as to the inert protective and/or drying gas conducted to the reactor. Thus, the preparation stages of the supported polymerization catalyst can be carried out in the same reactor, when the reactor is a container furnished with a mixer having at its bottom a sieve net permeable to the materials to be separated from the solid procatalyst product. The obtained procatalyst particles, on the other hand, remain on the sieve net from where they can be recovered for use.

This prior art method and device still has, however, many disadvantages. While, in the decantation operation, the middle size and thus useful procatalyst particles might be dispersed in the solution to be decanted and thus be lost, in the filtering operation, the harmful, finely-divided material may remain in the raw-procatalyst precipitate, resulting in a procatalyst which contains much of the harmful, finely-divided material. Thus, the problem is that the non finely-divided material is first sedimentated onto the sieve net and then acts as a finer sieve than the sieve net itself when the reaction liquid is pressed or sucked through the sieve net. Finely-divided material remains in the procatalyst precipitate and only clear solution comes through the sieve.

Another disadvantage in the above-mentioned conventional method and device is that new, harmful, finely-divided procatalyst is created during the mixing in connection with the washing. As it is hard to remove, among other, the above-mentioned finely-divided material by filtering, the washing generally has comprised several washing cycles, each implying mechanical strain on the fragile procatalyst e.g. in the form of the mixing. The more washing cycles including mixing, the more the procatalyst is broken and the more harmful, finely-divided material is created.

New finely-divided material is also created in connection with the drying where mixing is also needed to prevent the formation of a tight product cake which prolongs the drying. During the drying the procatalyst breaks particularly easily because there in no liquid left protecting its particles. Thus, for example, a mechanical mixing carried out by a propeller very easily breaks the catalyst.

If in the above-mentioned conventional method and device the mixing during the drying is left out, the alternative to feed inert gas, such as nitrogen, through the procatalyst cake which has settled on the sieve. As was mentioned before, the drying time is thereby very long, of the order of 1 to 2 days (24 h), and the amount of the drying gas used is very large. Nitrogen, which is generally used as the drying gas, always contains a little oxygen, hydrogen, carbon dioxide, etc., which react with the procatalyst and decrease its activity. It can be said that according to the conventional technique the drying can be carried out either so that harmful, finely-divided procatalyst is created or so that a part of the procatalyst is poisoned by the impurities of the drying gas.

Moreover, the capacity of the conventional reaction vessel is very small, because usually a large excess of transition metal compound is needed to keep the content of the reaction products of the equilibrium reactions between the procatalyst particles and the transition metal compound so low that enough product is being produced.

The aforesaid shows that the purpose of the present invention is to remove the finely-divided material from the product, to prevent the formation of new finely-divided material both in connection with the washing and the drying, to prevent the procatalyst from being poisoned when drying with inert gas and to increase the capacity of the reaction vessel when reacting carrier particles and a transition metal compound, All these aims have to be carried out so that the other properties of the procatalyst obtained will remain at least as good as before. The procatalyst particles must be useful with respect to their form, their chemical structure, their activity and their stereospecificity and they must produce useful olefin.

SUMMARY OF THE INVENTION

The above-mentioned aims have now been reached by a new method and device for the preparation of a solid procatalyst intended for the polymerization of olefins, which are mainly characterized by what is said in the corresponding patent claims. It has thus been realized that the liquid reaction residue of the reaction between the carrier particles and the transition metal compound and/or the washing liquid of the raw-procatalyst created as the result of the reaction with its impurities can be removed by keeping the vessel inclined to an acute angle with respect to the vertical axis, letting the raw-procatalyst settle to cover the part on the inclined side of the bottom sieve of the reaction vessel and by filter-decanting the liquid away from the vessel utilizing all the bottom sieve. As only a part of the bottom sieve is covered by the solid procatalyst, the residue liquid quickly finds its way through the uncovered openings of the bottom sieve bringing:easily with it the harmful, finely-divided material created in the reaction or in the washing.

The corresponding equipment according to the invention which comprises a vessel furnished with aggregates and valves, a mixer arranged inside the vessel and a bottom sieve arranged inside the vessel, has thus been improved by furnishing it with a vessel tilting means and by building aggregates, valves, a mixer and a sieve so that they can operate both in the normal position of the vessel and when it is tilted to different angles.

As was mentioned in the beginning, the steps of the method according to the invention are:
a) particles of the carrier and the transition metal compound are fed into a vessel, where they
b) are mixed and reacted to give raw procatalyst particles and a liquid reaction residue,
c) the reaction residue is removed through a bottom sieve in the vessel,
d) the raw procatalyst is washed with a washing liquid, so that its impurities are removed, through the above-mentioned bottom sieve,
e) the washed raw procatalyst is dried by conducting inert gas through it, and
f) the prepared procatalyst is removed from the vessel.

According to the present invention the liquid reaction residue is removed at stage c) and/or the washing liquid with its impurities is removed at stage d)
i) by keeping the vessel inclined to an acute angle with respect to the vertical axis,
ii) letting the raw procatalyst settle to cover the part of the inclined side of the bottom sieve, and
iii) by filter-decanting the liquid away from the vessel by utilizing the whole of the bottom sieve.

When it is assumed that the axis of the cylindrically symmetrical reaction vessel is vertical and the bottom sieve is in a horizontal position, it is advantageous to keep the vessel inclined to an angle of about 45° with respect to the vertical axis according to the above-mentioned stage (i). A condition of the use of this angle is, however, that the amount of the carrier particles is restricted so that the raw-procatalyst does not cover more than about one-half of the surface of the bottom sieve when the vessel is inclined to the angle mentioned. Thus at least one half of the surface of the bottom sieve remains free for the away-sedimentation of the liquids, whereby, simultaneously, the sieve prevents the removal of useful larger-sized particles together with the decanting liquid. Another advantage is that the liquid also escapes through the holes of the sieve part being beneath the raw procatalyst, whereby no liquid reaction residue nor washing liquid with its impurities is left in the precipitate. With the present arrangement the disadvantages caused by both the decantation and the filtering have thus been removed.

In order to make the filtering-decantation still more effective, is advantageous to diminish the tilt angle of the vessel during the filtering-decantation so that the liquid all the time essentially covers the part of the bottom sieve uncovered by the raw-procatalyst. Hereby, the whole of the bottom sieve is being utilized.

In order that the removal of the harmful, finely-divided material together with the liquid reaction residue and the washing liquid would be successful, the finely-divided material should be dispersed in the liquid to be removed. The dispersion can be achieved, for example, by adjusting the mixing so that the larger particles of the procatalyst settle on the bottom sieve and the smaller ones remain in the liquid. According to one embodiment the finely-divided portion of the procatalyst, which can go through the sieve, is suspended in the liquid by keeping the vessel upside down and/or by mixing its contents before above-mentioned stage (i), whereby the removal of the finely-divided material together with the residual liquids is particularly successful.

An efficient removal of the liquid reaction residue and the washing liquid also enables the carrier particles and the transition metal compound to react more efficiently by using several stages. According to one preferred embodiment the method according to the invention comprises several, preferably two, reacting stages, i.e. (b) stages and removal stages of the reaction residue liquid, i.e. (c) stages, in which, after the removal of the reaction residue liquid, fresh transition metal compound is added to the solid procatalyst intermediate product. According to another embodiment the above-mentioned stages (b) and (c) are carried out simultaneously so that fresh transition metal compound is fed continuously into the procatalyst intermediate product simultaneously as reaction residue liquid is removed by means of the filtering-decantation according to the stages (i) to (iii) or in any other manner. This embodiment increases the capacity of the reaction vessel so that the material ratio between the transition metal compound and the reaction products which harm the reaction increases and thus enables the use of larger carrier amounts in the reaction vessel. Thus, the aim of the invention to increase the capacity of the reaction vessel is fulfilled.

When the carrier particles and the transition metal compound have been reacted to give raw procatalyst particles and the liquid reaction residue simultaneously formed has been removed, the raw procatalyst is washed with washing liquid, which is then, along with its impurities, removed through the bottom sieve of the reaction vessel. According to one preferred embodiment the washing stage (d) is carried out so that during one washing cycle: the washing liquid is added; mixing is carried out with a mixer; the vessel is turned upside down; the mixing is continued, and the vessel is tilted to the acute angle with respect to its initial vertical axis to remove the washing liquid with its impurities according to the stages (i) to (iii). The separation of the reaction residues and the harmful, finely-divided material from the solid raw procatalyst particles is accelerated by turning the vessel upside down in a way that does not break the fragile procatalyst particles. If only a mixing were used, the washing time would be prolonged and a part of the usable procatalyst particles would be broken to give harmful, finely-divided material.

As already mentioned, a too heavy and lengthy mixing during the washing cycle results in a growing portion of the finely-divided material. Therefore, it is advantageous to continue the mixing for 10 minutes at the most and to maintain the temperature at a value of about +70° to 80° C. for the dissolution of the soluble reaction residues in the washing liquid. It is also advantageous to use in the washing stage (d) 2 to 4, preferably 3, washing cycles of the raw procatalyst.

After the washing the raw procatalyst is dried by conducting inert gas through it. According to one embodiment of the invention the raw procatalyst is dried at stage (e): by keeping the vessel in vertical position and by leveling the raw procatalyst on the bottom sieve; by feeding inert gas into the space above the raw procatalyst and by creating an under-pressure in the space below the bottom sieve. A preferred inert gas is thereby dried and deoxygenated with nitrogen. The drying is preferably continued for about 0.5 to 2 hours and most preferably for about 1 hour. The nitrogen flow is preferably adjusted so that 0.1 to 0.3, most preferably about 0.15 to 0.20, kg of $N_2$/h, is flowing through the raw procatalyst per kilogram of carrier. The low pressure is preferably of the order about 0.1 to 0.4 bar, the temperature being preferably about +70° C.

According to a further embodiment raw procatalyst is mixed during the drying by tilting or rotating the vessel around its horizontal tilt angle. Since the rotation of the vessel takes place slowly, the fragile procatalyst particles do not break into finely-divided material as happens when a rapidly rotating mixer is used. In this embodiment the inventive idea based on the tilting of the vessel has, thus, been used to prevent the creation of finely-divided material during the drying in compliance with one important aim of the invention.

After drying the raw procatalyst the obtained procatalyst is removed from the vessel. According to one preferred embodiment it is not necessary to remove the procatalyst according to the conventional method through the opening in the bottom sieve, but the idea of tilting the vessel can be utilized in this emptying stage (f) so that the vessel is tilted to an obtuse angle, for example, to about 150° with respect to its original vertical axis, after which the procatalyst is removed through an outlet in the normal upper end of the vessel. As a matter of fact, the same opening can be used both for the feeding of the carrier and the removal of the final procatalyst product, which partly facilitates the process.

As it is necessary to tilt and even turn upside down the vessel during the various stages of the method, it is advantageous to use a mixer with the distance from the mixing member to the bottom sieve of the vessel adjustable at the various stages of the method. The site and rotation velocity of the mixing member can be regulated so that it mixes the liquid phase with a velocity in which only the finely-divided material is in suspended state, or with a velocity which holds the whole carrier or raw procatalyst amount in a suspended state in the reaction liquid.

It is advantageous to combine the above-mentioned operational modifications connected to the inventive idea with the following steps of the process in order to achieve a most efficient method of preparing the procatalyst. According to one embodiment the carrier and the transition metal are fed into the vessel at stage (a) in the beginning of the method so that: first an inert medium is fed into the vessel; then the carrier is dispersed into the medium by mixing, and, finally, the transition metal compound is added in liquid state into the hydrocarbon dispersion. Preferably, a $MgCl_2$-$C_2H_5OH$-complex is used as the carrier, $TiCl_4$ is used as the transition metal compound and a $C_5$–$C_8$-hydrocarbon is used as the inert medium. According to one embodiment a $MgCl_2$-$C_2H_5OH$-complex is used, the molar ratio between $MgCl_2$ and $C_2H_5OH$ of which is about 2.5 to 3.5 and, preferably, about 2.7 to 3.3. The particle size should be limited to below about 150 µm. Thereby, $TiCl_4$ is preferably added at a temperature of −25° to −15° C. and the temperature is preferably raised during the addition of the $TiCl_4$ or thereafter at a rate of about 5° to 20° C./h, still more preferably at a rate of about 5° to 15° C./h, and within a temperature range of about −20° to +40° C.

It is also advantageous to maintain the state of the vessel during the reaction between the carrier particles and the transition metal compound at stage (b) of the method at an over-pressure and to simultaneously conduct through it an inert gas, such as nitrogen. The over-pressure is hereby on the order of 1 to 100 bars, preferably 1 to 50 bars, and most preferably about 1 to 5 bars.

It is also advantageous to prepare the carrier particles of the $MgCl_2$-$C_2H_5OH$-complex by spray-crystallization, since by that method carrier particles are obtained which have a particularly suitable particle morphology and size distribution as well as a high mechanical strength. Thus, according to one embodiment of the invention the carrier particles are prepared by spraying a complex melt, the composition of which is $MgCl_2 \cdot 3.5C_2H_5OH$ and the temperature of which is about 120° to 130° C., through a atomizing nozzle into a chamber, where the temperature is about 30° to 50° C., after which the viscous droplets are conducted through another zone, the temperature of which is about 10° C. lower and where the final solidification of the droplets take place. The particles prepared by this kind of spray-crystallization method are mechanically much stronger than, for example, the particles prepared by spray-evaporation and are thus especially well suited for the method according to the invention, in which high mechanical requirements are advantageous for mixing operations and the like.

According to one significant embodiment of the invention an internal donor is also added into the vessel during the reaction stage (b). The internal donor can be, for example, an aromatic dicarboxylic acid ester, such as diisooctyl phthalate. The donor should be added about 2 to 5 hours after the addition of the $TiCl_4$ during a period of slow heating so that its reaction does not cause the medium to boil.

In the method according to the invention the space of the vessel should also be maintained in an over-pressure during the reaction between the carrier particles and the transition metal compound at stage (b) and through it should preferably be conducted an inert gas, such as nitrogen.

The invention also relates to equipment for the preparation of a procatalyst by means of feed, reaction, removal, separation, washing and drying operations. The equipment comprises a vessel furnished with aggregates and valves, a mixer provided inside the vessel, and a bottom sieve provided inside the vessel. The equipment also comprises, according to the idea of the invention, a tilting means for the vessel, and aggregates, valves, mixer, and sieve which are constructed to be operable also when the vessel is tilted.

In order to maximize the efficiency of the tilting vessel the tilting means is preferably adjustable with respect to the tilt angle and tilting rate. The vessel preferably also comprises inert gas feed and removal aggregates with valves and washing liquid nozzles arranged in the inner space of the vessel, preferably in the center of it. When the nozzles have been arranged evenly in the inner space of the vessel, the raw procatalyst moisten more evenly and the washing becomes more efficient. The nitrogen aggregates should be arranged so that both the vessel, the aggregates the valves and the pipes leading to the vessel can be flushed with an inert gas.

As, according to one embodiment, the drying of the raw procatalyst takes place by feeding nitrogen into the space above the procatalyst simultaneously as an under-pressure is sucked in the space beneath the sieve, the space beneath the bottom sieve of the vessel preferably is furnished with an under-pressure aggregate with its necessary valves.

As a tiltable and rotatable vessel forms the basic idea of the invention the upper surface of the solid material and the liquid in the vessel will change all the time according to the internal space geometry of the vessel, whereby it is advantageous to use an adjustable mixing device. According to one such embodiment the mixing member (or members of the mixer have been arranged so that its or their) distance to the bottom sieve can be regulated.

As in conventional arrangements, a downwards conical bottom sieve furnished with a procatalyst outlet was used, in the present invention, in which the vessel can be filled or emptied. However, such a sieve is not necessarily needed any more. Thus, for example, a planar sieve can be used in the present invention to render a maximal part of the sieve available for use during the whole filtering-decantation period. To achieve the best possible particle size for the procatalyst the diameter of the bottom sieve holes should be of the order of about 200 μm.

As already mentioned the vessel according to the invention can be emptied by turning it upside down or almost upside down. The outlet of the solid procatalyst is thereby located in the upper end of the vessel, to which the procatalyst is then transferred when the vessel is turned. It is thereby preferable to tilt the vessel to an obtuse angle with respect to the original vertical axis, for example to an angle of about 150° C.

Figure 1:
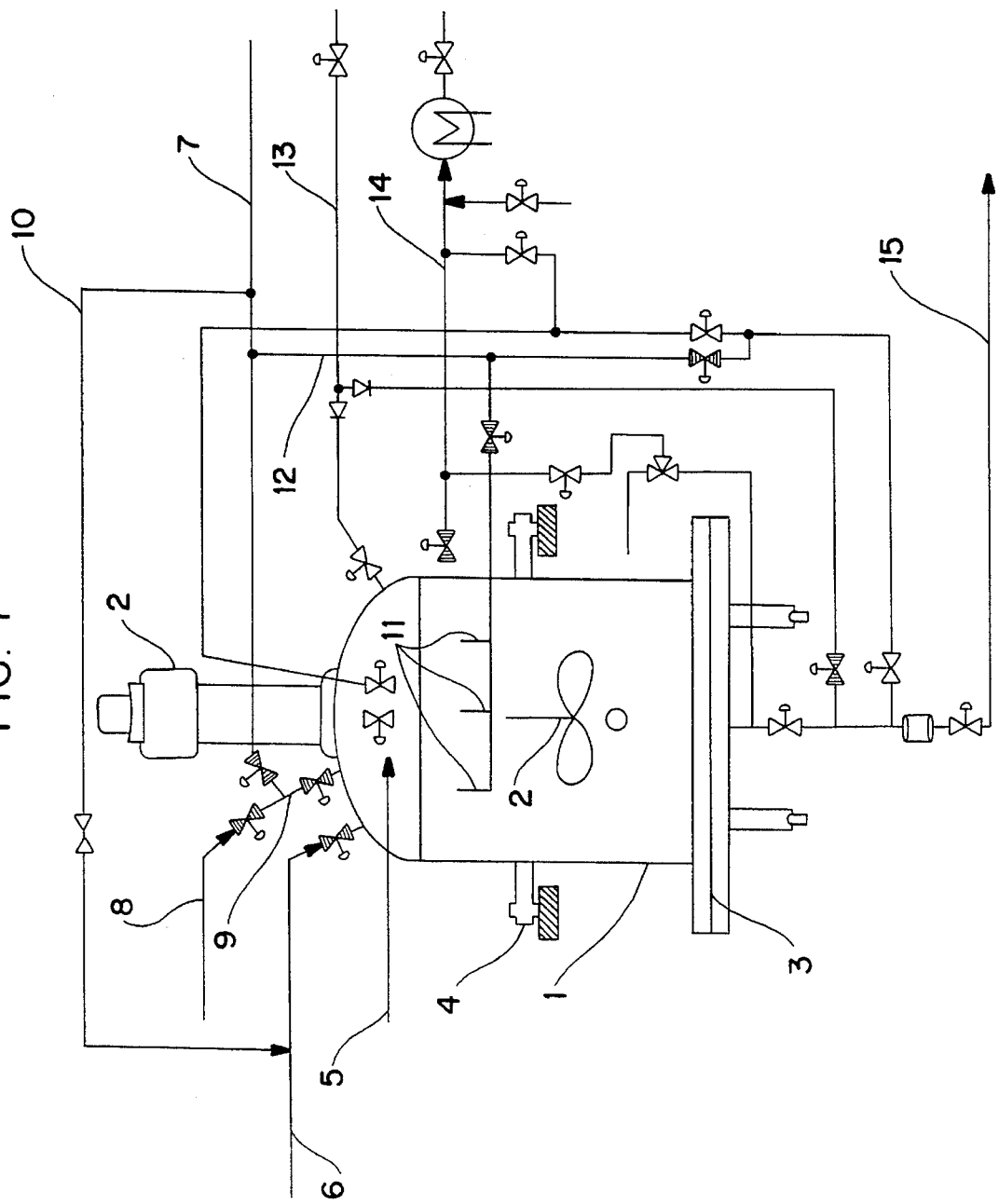
FIG. 1 depicts a mixing device according to one embodiment of the present invention.

In the following the equipment according to one embodiment of the invention for the preparation of the procatalyst and the function of the equipment according to one embodiment of the method according to the invention, are presented.

EQUIPMENT

The equipment shown in FIG. 1 consists of a vessel 1 for carrying out the feed, reaction, separation, removal, washing and drying operations. In connection with the vessel 1 a mixer 2 has been arranged for mixing together the materials participating in the operations mentioned. In the bottom of the vessel 1 there is a bottom sieve 3 for the separation of the formed procatalyst particles from other materials participating in the operations.

The vessel 1 is suspended from a vessel 1 tilting means 4 according to the invention. The tilting means 4 shown in the figure is presented in the form of a horizontal axis member, which has been attached to a stable base with bearings. The tilting can be effected in any manner, for example, by connecting a gearing to the axis member or by furnishing the vessel suspended,from the horizontal axis with tilting devices gripping it. The volume of the vessel can be of any suitable size, but in the experiment concerned a vessel with a volume of 1.5 m³ was used.

The equipment naturally also comprises a number of operational units, which are not shown in the figure. These are, for example, the pipings of the materials participating in the operations and the storage vessels with the transfer elements and valves, absorbers, purifying devices of the materials, treatment devices of the reaction residues, and cooling, heating, nitrification, pressurization and underpressurization devices. Also feed preheaters, reaction product and residue analyzers and reaction condition regulating devices can be connected to the equipment.

The most important feeding aggregates of the equipment are the combined carrier feeding and catalyst-removing aggregate with its valves 5, the $TiCl_4$ feeding aggregate with its valves 6 and the combined reaction medium 7 and donor 8 feeding aggregate 9 with its valve systems. Between the feeding pipe 6 of the $TiCl_4$ and the feeding pipe 7 of the reaction medium there is the trunk 10, by the aid of which the feeding pipe 6 can be washed with the reaction medium after use.

As the reaction medium is also used as a washing liquid, a pipe 12 leading to the washing nozzles 11 has been connected to the feeding pipe 7 of the medium. Nitrogen gas is brought to the vessel 1 through the pipe 13. The gases formed in the operation are removed through pipe 14 connected to the upper part of the vessel 1 and the liquid residues are removed through the residue line 15 connected to the space beneath the bottom sieve 3 of the vessel 1. Moreover, the equipment comprises duct connections for the flushing of the residue line 15 with a washing medium and nitrogen and a backfeed pipe with its gas separators for the bottom liquid of the vessel 1.

EXAMPLE

The equipment presented in FIG. 1 functioned so that the vessel 1 was cooled to a temperature of about −20° C. After this the vessel 1 was nitrified with pure nitrogen gas fed from the pipe 13, the nitrogen being removed through the bottom valve. Then, hydrocarbon solvent was added into the vessel 1 (Neste's product LIAV) through pipe 7 and valve system 9. The amount of hydrocarbon solvent was about 350 kg. The vessel 1 was kept in an upright position, that is in an angle of 0° C., at the over-pressure of 0.5 bars and the mixer was still. When all LIAV had been added the mixer was started for the addition of the carrier.

29 kg of carrier was added from a large conical vessel through a valve at the end of the feed pipe 5 into the reaction vessel 1. The angle of the vessel 1 still being 0° C. and the temperature being about −20° C. $TiCl_4$ was dosed to the vessel 1 through the pipe 6 and its valve. The amount was such that the molar ratio $TiCl_4$/carrier was about 10 and the whole amount was added evenly in about one hour. After the addition of the $TiCl_4$ the valve of the feed pipe 6 was flushed with LIAV through the circulating tube 10.

Then the over-pressure of the reaction vessel was raised to 2.5 bars. Simultaneously, the flushing of the gas space of the reaction vessel 1 with nitrogen through the pipe 13 and its valve was started. The nitrogen flow was adjusted to about 5 kg/h. Next, the temperature was raised from the starting temperature to about +20° C. within three hours, that is, the raising rate of the temperature regulation was set to +12.7° C./h.

At the temperature of +20° C. di-isobutylphthalate(DIBP) donor was added over half an hour so that the molar ratio donor/Mg was 0.15. The donor was added through the pipe 8, the valve system 9 excluding the LIAV feed pipe 7.

After the addition of the donor the temperature was raised during four hours from +20° C. to +110° C. The gas space of the reaction vessel 1 was furthermore flushed with nitrogen 5 kg/h, the angle of the reactor was maintained at the value of 0° C., the mixing was continued and the over-pressure was still maintained at the value of 2.5 bars. When the temperature of the vessel 1 had reached 110° C., it was maintained there for one hour.

Then the reactor vessel 1 was tilted by the tilting means 4 into an angle of 45°, the mixer 2 being still switched-on, after which the mixer 2 was stopped. The filtering-decantation was started by opening the valves of the removal pipe 15. Simultaneously, the level of the liquid reaction residue was observed and the vessel 1 was turned upright as the reaction residue liquid sank so much that nitrogen began to flow into the residue line 15.

When the residue flow had stopped, the bottom valve between the vessel and the residue line 15 was closed and another dose of $TiCl_4$ was added through the feed aggregate 16. Its amount was such that the molar ratio $TiCl_4$/Mg was 30. After the addition the temperature of the vessel 1 was maintained at 110° C. and the over-pressure at 0.5 bars during two hours. The vessel 1 still was in upright position that is in an angle of 0°.

After a two-hour-reaction the formed liquid residues and the residues dispersed in the liquid were filtered from the vessel 1 through the residue line 15 into the residue container. This took place by raising the over-pressure of the vessel 1 to at least 4.0 bars, tilting the vessel 1 by the aid of the tilting means 4 in an angle of 45° with simultaneous mixing, stopping the mixer and starting the filtering through the bottom sieve 3 by opening the valves to the residue line 15. Simultaneously, the liquid level of the vessel 1 was observed and the vessel 1 was turned upright gradually as the level sank so much that nitrogen began to flow into the residue line 15.

When the second filtering of the reaction residues was over the obtained raw procatalyst was washed three times with destilled LIAV. The temperature during the wash was between +70° to +80° C. Washing liquid was added into the vessel 1 through the lines 7 and 12 and the washing nozzles 11. After closing the valves in the upper part of the vessel 1 the vessel 1 was tilted by the aid of the tilting means 4, the mixing being switched-on, upside down, that is, in an angle of 180°, switching simultaneously the pressure control to the former bottom. Thereafter, the mixing was continued for about 10 minutes.

The filterings were started by raising the over-pressure of the vessel 1 to 4.0 bars in the washing position (180°). Then, the pressure control through the bottom was stopped and the reactor was tilted in an acute angle of 45° and the mixer was stopped. Then, filtering was started by opening the valves to the residue line 15, by observing the flow and turning the vessel 1 gradually upright as the level sank so much that nitrogen began to flow into the residue line 15. The filtering stopped when the vessel 1 was upright, that is, in an angle of 0°.

The drying was carried out at low pressure, the vessel 1 being in upright position (0°) and the mixer 2 being switched-off. The vessel 1 was flushed with nitrogen, which was fed with a rate of about 5 kg/h through the line 13. The temperature of the vessel i was about +70° C. The low pressure varied during the drying between 0.1 to 0.4 bars. The drying time was hour.

After the drying the vessel 1 was tilted in an angle of 150° and the dried prepared procatalyst was removed through the carrier feed line 5 by using, simultaneously, the mixer to scrape out the procasalyst. Other mechanical means can be utilized, too, to remove the procatalyst as carefully as possible from the vessel 1. After use the reaction vessel 1 and the lines were washed for reuse.

RESULTS

During this experiment the procatalyst was not noticed to be broken or poisoned. Its particle size distribution was such that 22.1% by weight of the particles had a diameter of below 20 μm. $D_{50}$ was 62 μm and the width of the distribution or the span-number was 2.59.

The procatalyst obtained was tested in predetermined polymerization conditions. A two-liter bench reactor was used for the polymerization, to which was added 20 to 30 mg of procatalyst. To this amount was mixed 620 μl of triethylaluminium cocatalyst and 200 μl of a 25 % heptane solution of an internal cyclohexylmethyl methoxysilane donor. As a medium 30 ml of heptane was used. The polymerization was carried out at a temperature of +70° C. and at a pressure of 10 bars. The partial pressure of hydrogen during the polymerization was 0.2 bars. The polymerization was continued for three hours. After that the activity of the procatalyst was measured on the basis of the polymerization yield. The solvent part of the polymer was measured by dissolving a certain polymer amount into the solvent and by measuring the evaporation residue of the clear solution.

The bulk density and the particle size distribution of the polymer sample were determined. In connection with the particle size distribution measurements the total amount of finely-divided material was estimated. All polymer particles, having a diameter smaller than 1 mm were defined as finely-divided material. The isotacticity was measured by the aid of a heptane elution and the isotacticity index was measured by using the results of the evaporation residue measurements. The melt index was measured at a temperature of 230° C. by using a 2.16 kg weight.

The performed experiment gave the following results: the titanium content, the donor content, the particle size distribution, the catalyst yield, the catalyst activity, the polymer isotacticity, the polymer melt index and the polymer bulk density of the procatalyst obtained were similar to those of other procatalysts of the same kind.

The titanium content of the procatalyst was 2.4% by weight and the donor content was 9.7% by weight. The particle size distribution was the following:

TABLE 1

| The particle size distribution of the procatalyst | | | |
|---|---|---|---|
| D(0.1) μm | D(0.5) μm | D(0.9) μm | Span μm |
| 6.7 | 52.4 | 142.3 | 2.59 |

The procatalyst yield was very high, that is, 99%. The activity was 15.8 kg PP/g of cat. and the isotacticity was 98.9% the isotacticity index being 98.1, which are good values and of the same order as good-quality commercial procatalysts.

The melt index of the polypropylene obtained with the procatalyst was 7.2 g/10 min. and the bulk density was 0.43 g/ml. Special attention was paid to the particle size distribution of the polymer material yielded by the procatalysts prepared according to the invention. The distribution of the polypropylene prepared by the procatalyst according to the example was the following:

TABLE 2

| The particle size distribution of the polypropylene | | | | | |
|---|---|---|---|---|---|
| particle size mm | 2.0 | 1.0 | 0.5 | 0.18 | 0.10 |
| portion (%) | 47.1 | 46.8 | 4.5 | 0.9 | 0.4 |

It can be seen that the portion of the finely-divided material (<1 mm) is only 5.8%, so the operations carried out according to the invention have not broken the catalyst particles.

The following results are thus obtained with the equipment according to the invention. The titanium content of the procatalyst decreases to the value of below 2.5% by weight, while the activity is retained. The activity remains high, that is at nearly 16 kg PP/g of cat. The drying time is decreased from the normal 1 to 2 days (24 h) to as short as 1 to 2 h. The content of the polymer product's finely-divided material is low, as desired, that is below 6%. The bulk density is normal and of the order of 0.43 kg/l. The amount of the washing cycles needed decreases from the normal five to three, which decreases the treatment time and saves the procatalyst particles.

We claim:

1. A method for the preparation of a solid procatalyst suitable for the polymerization of olefins wherein the procatalyst comprises a transition metal compound reacted with a carrier by carrying out in the method the following consecutive steps:

a) feeding the transition metal compound and particles of the carrier into a vessel, which in its initial position has an essentially horizontal bottom sieve, b) mixing and reacting the transition metal compound and the particles of the carrier to produce raw procatalyst particles and a liquid reaction residue, c) removing the liquid reaction residue through said bottom sieve of the vessel, d) washing the raw procatalyst particles with a washing liquid, so that impurities in the raw procatalyst are removed through said bottom sieve, e) drying the washed raw procatalyst particles by conducting an inert gas therethrough to give said solid procatalyst, and f) removing the solid procatalyst from the vessel;

provided that the liquid reaction residue or the washing liquid containing said impurities from said raw procatalyst is removed at step (c) or (d), respectively, according to the sub-steps of:

i) keeping the vessel inclined at an acute angle with respect to its initial position, ii) letting the raw procatalyst settle to cover an inclined side of the bottom sieve, and iii) filter-decanting the liquid reaction residue away essentially through the side of the bottom sieve, which is uncovered by the raw procatalyst particles.

2. The method according to claim 1, wherein the vessel is kept according to sub-step (i) at the acute angle of about 45° with respect to its initial position.

3. The method according to claim 1, wherein the acute angle of the vessel is decreased during the filter-decanting of sub-step (iii) so that the liquid reaction residue essentially covers the portion of the bottom sieve that is not covered by the raw procatalyst particles.

4. The method according to claim 1, wherein a finely-divided raw procatalyst portion that can go through the bottom sieve is suspended in the liquid reaction residue to be removed by keeping the vessel turned upside down or by mixing before removing the finely-divided raw procatalyst portion and the liquid reaction residue in sub-step (iii).

5. The method according to claim 1, wherein the method comprises repeating the (b) and (c) steps prior to step (d), wherein after the removal of the reaction residue liquid in the first step (c), step (b) is then repeated by adding a fresh transition metal compound to a solid procatalyst intermediate product which is formed in the first step (c) of the method.

6. The method according to claim 1, wherein steps (b) and (c) are carried out simultaneously so that a fresh transition metal compound is continuously fed into the vessel simultaneously with the removal of the reaction residue liquid by means of said filter-decanting according to the sub-steps (i) to (iii).

7. The method according to claim 1, wherein the raw procatalyst particles are washed at step (d) as follows during one washing cycle:

washing liquid is added;

mixing is carried out with a mixer;

the vessel is turned upside down;

the mixing is continued; and the vessel is tilted to said acute angle with respect to its initial position to remove the washing liquid, along with said impurities, according to sub-steps (i) to (iii).

8. The method according to claim 7, wherein the mixing in step (d) is continued for 10 minutes at most at a temperature of about +70° to +80° C.

9. The method according to claim 1, wherein in the washing step (d), 2 to 4 cycles of washing of the raw procatalyst particles occur.

10. The method according to claim 1, wherein the washed raw procatalyst particles are dried to said solid procatalyst at step (e) as follows:

distributing the raw procatalyst on the bottom sieve by keeping the vessel in an initial upright position;

feeding an inert gas into the vessel into a space above the raw procatalyst particles; and creating a partial vacuum in a space beneath the bottom sieve.

11. The method according to claim 10, wherein the drying according to step (e) is continued for about 0.5 to 2 h, with an under-pressure on the order of about 0.1 to 0.4 bars, a temperature being about +70° C. and a nitrogen flow of 0.10 to 0.30 kg of $N_2$/kg of the carrier/h.

12. The method according to claim 1, wherein the procatalyst particles are mixed during the drying step (e) by tilting or rotating the vessel around a horizontal tilt axis.

13. The method according to claim 1, wherein the procatalyst particles are removed at step (f) by tilting the vessel to an obtuse angle of about 150° C., with respect to the initial position thereof, and removing the procatalyst particles therefrom.

14. The method according to claim 1, wherein a mixer is used, having a distance between a mixing member and the bottom sieve thereof, adjustable at various stages of the method.

15. The method according to claim 1, wherein the carrier and the transition metal compound are fed into the vessel at step (a) by the following sub-steps:

feeding an inert medium into the vessel;

dispersing by mixing the carrier into the medium to give a dispersion of the carrier; and adding the transition metal compound in a liquid state into the dispersion of the carrier.

16. The method according to claim 15, wherein a $MgCl_2$-$C_2H_5OH$ complex is the carrier, $TiCl_4$ is the transition metal and a $C_5$–$C_8$ hydrocarbon is the inert medium.

17. The method according to claim 1, wherein an internal electron donor is added to the vessel during step (b).

18. The method according to claim 1, wherein:

during the reaction of step (b) between the carrier particles and the transition metal compound, the reactants are kept at an over-pressure and nitrogen is conducted therethrough.

19. The method according to claim 9, wherein in the washing step (d) three cycles of washing of the procatalyst particles occur.

20. The method according to claim 11, wherein:

the drying according to step (e) is continued for about 1 hour, and the nitrogen flow is about 0.15 to 0.20 kg of $N_2$/kg of carrier/h.

* * * * *